Oct. 15, 1929.  A. E. HUDD  1,731,664
TRAIN CONTROL SYSTEM
Filed June 23, 1923  2 Sheets-Sheet 1
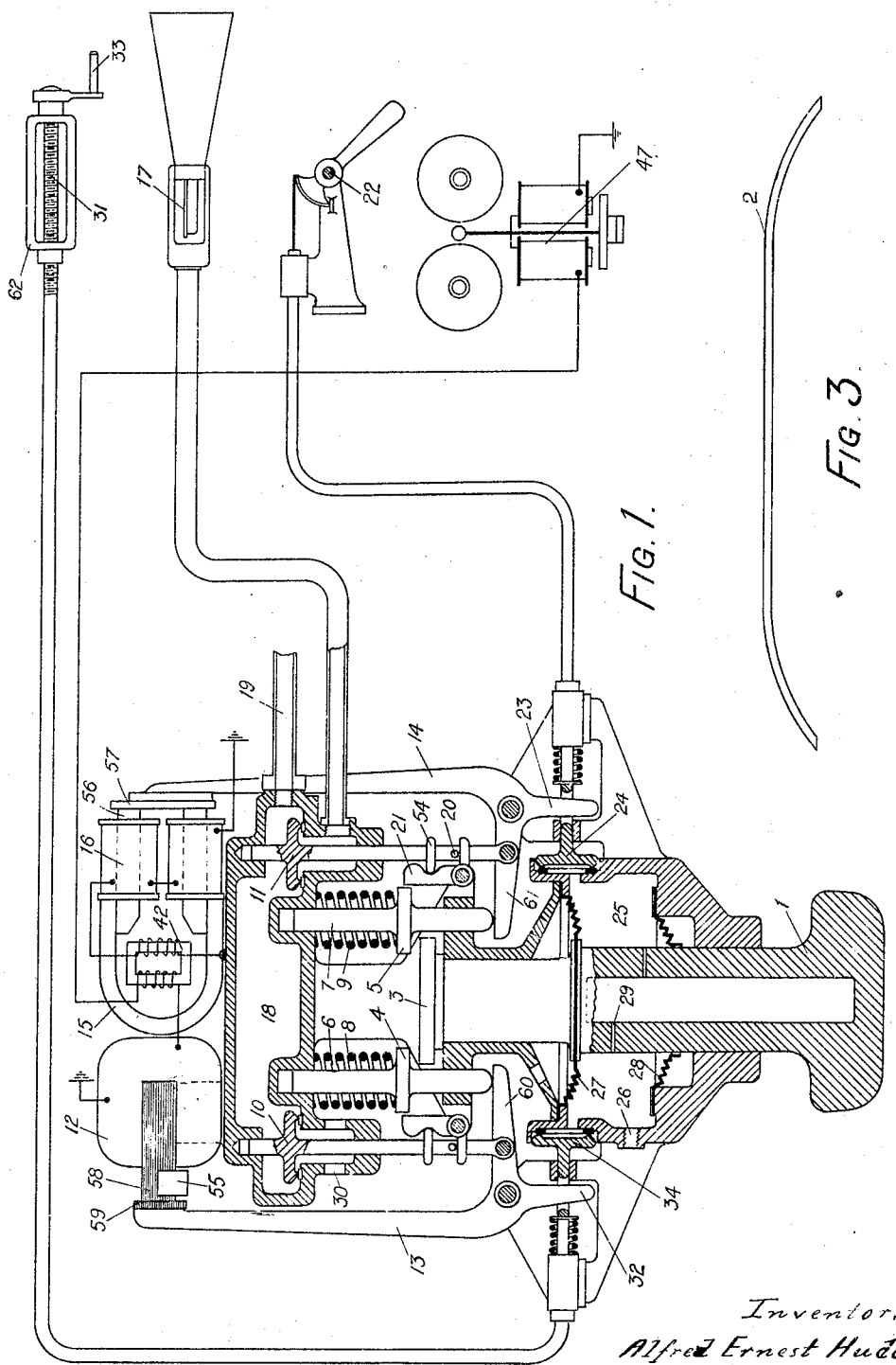
Inventor:
Alfred Ernest Hudd

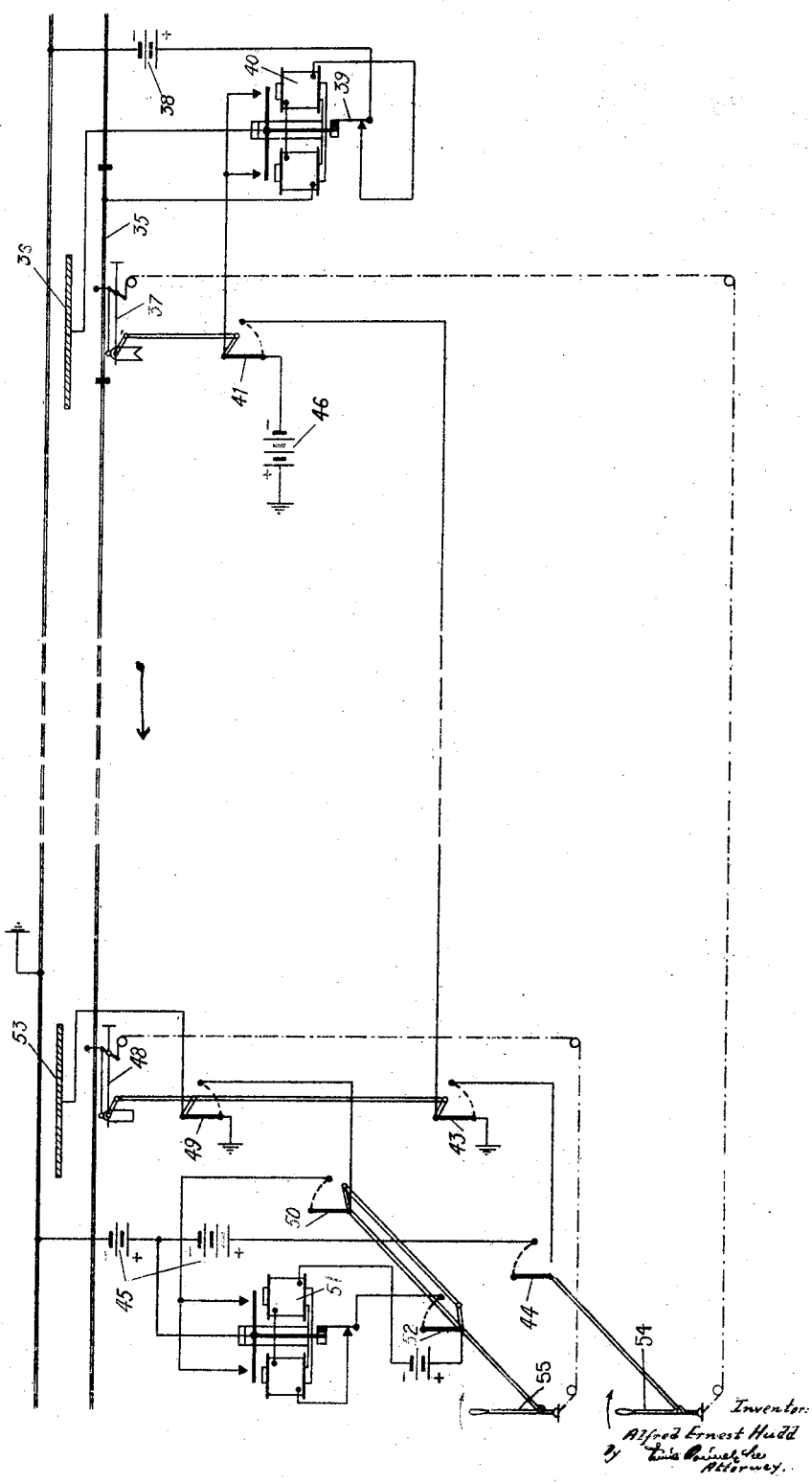

Patented Oct. 15, 1929

1,731,664

UNITED STATES PATENT OFFICE

ALFRED ERNEST HUDD, OF NEW BRIGHTON, ENGLAND, ASSIGNOR, BY MESNE ASSIGNMENTS, TO AUTOMATIC ELECTRIC INC., OF CHICAGO, ILLINOIS

TRAIN-CONTROL SYSTEM

Application filed June 23, 1923, Serial No. 647,292, and in Great Britain August 16, 1922.

The present invention concerns improvements in or relating to train control systems and has broadly for its object the provision of an arrangement which will best conform to the requirements which it has been ascertained are highly desirable if not absolutely essential in systems of this kind.

One object of the invention is the provision of apparatus on the locomotive which is of a substantial and mechanical character and avoids the necessity for batteries or other sources of electrical energy being provided on the locomotive, while another important object is the provision of apparatus having the above characteristics which is adapted to respond to variable currents transmitted from apparatus located alongside the track to give either a warning or service application or an emergency application of the brakes according as to whether the train is passing a distant signal or a stop signal at "danger".

According to one feature of the invention, a composite current, each component part of which is adapted to effect the energization of a different apparatus, is adapted to be connected to a ramp located alongside the track to energize an electromagnetic brake controlling device on a passing train; preferably the current employed is a pulsating current which is composite in that it is adapted to operate both a direct current electromagnet and an alternating current electromagnet through a transformer. This has the advantage that stray direct or alternating currents by themselves are incapable of interfering with the application of the brakes when required.

Further according to another feature of the invention different kinds of current are arranged to control apparatus adapted to bring about different degrees of braking, so that by employing pulsating current flowing in either one direction or the other, different results can be brought about by using a polarized electromagnet.

An important feature of the present invention is that the mechanical engagement between the ramp and the collecting shoe is identical both at the distant and the home signal, although only a service application of the brakes may be made in one case and an emergency application in the other case or no application may be made at all.

The ramp is identical at each signal and is located in the same position relative to the rails. The collecting shoe makes the same movement in each case and in addition to permitting the valves to be released by its mechanical movement, it also, by its electrical contact with the ramp, connects the electromagnetic brake controlling devices to the ramp so that the electrical current flowing thereover, if any, according to its characteristics, determines whether a brake application is to take place and if so whether it is to be an emergency or a service application. The combined electrical and mechanical control exerted through and by the collecting shoe on the valve or valves controlling the application of the brakes forms another feature of the present invention which has the important advantage that it avoids the necessity of batteries or like sources of energy on the locomotive.

These and other features not specifically mentioned at this point will be more clearly understood from the following description taken in conjunction with the accompanying drawings. These show one embodiment of the invention which is by way of example only since it will be understood that considerable modifications may be made in the constructional details without departing from the spirit of the invention.

Figure 1 shows the apparatus which is carried on the locomotive.

Figure 2 is a circuit diagram showing the track apparatus and the necessary connections to the ramp for the desired effects to be brought about, while Figure 3 shows an elevation of the ramp.

Referring now to Figure 1, 1 is a shoe adapted to be moved upwards in a vertical direction when it engages with a ramp 2 (Fig. 3) located in the centre of the track and to return under gravity to its normal position when clear of the ramp. The shoe is hollow for a purpose which will be described subsequently, and at its upper end carries a collar 3. This collar is adapted when the shoe is raised to engage with collars 4 and 5 on spindles 6 and 7 which are arranged on opposite sides of the shoe and are guided so as to move vertically. The spindles 6 and 7 are normally retained in their lowest position by the helical springs 8 and 9. In this position they bear on the arms 60 and 61 of two bell crank levers and thus prevent the opening of the valves 10 and 11, controlling the application of the brakes. In the example shown, the brakes are assumed to be of the vacuum type, but it will be apparent to those skilled in the art that the invention is equally applicable to systems in which the brakes are operated by compressed air; the chief difference would be that the valves would operate in the other direction. The valve 10, however, will also be held on its seating if the alternating current electromagnet 12 is energized, as its armature 59 which is carried by the arm 13 of the bell crank lever is then held against the pole pieces 58. Similarly the valve 11 may be held closed by the arm 14 of the other bell crank lever if armature 57 is attracted due to a suitable excitation of a polarized magnet comprising a permanent magnet 15 having exciting coils 16 on its pole shoes 56. The polarized magnet is so designed that it will maintain its armature attracted when current in one direction is fed into its windings but will release its armature if current in the opposite direction or no current at all is supplied. The alternating current electromagnet is adapted on excitation to hold its armature attracted without chattering, the eliminating of chattering being brought about in this case by splitting the pole pieces 58 centrally for a short distance and fitting one half with a copper sleeve 55.

If the polarized electromagnet is not excited in a suitable manner when the shoe is raised by contact with the ramp, valve 11 will no longer be retained by arm 61 and accordingly will be raised owing to the difference of pressure on its two sides. When this occurs, pin 20 on the valve spindle will release the detent 21 so as to permit it to be forced by the collar 54 under the collar 5 and so prevent the spindle 7 from restoring to normal when the shoe leaves the ramp. The opening of the valve 11 connects the chamber 18, which is in connection with the train pipe 19, to the atmosphere by way of the reed 17. A restricted amount of air will, therefore, be admitted to the chamber 18 and its passage past the reed 17 will sound an audible warning to the engine driver, while at the same time the reduction of the vacuum will bring about a service application of the brakes. The reclosing of valve 11 is brought about through the agency of the lever 22 operating through a Bowden cable or by other suitable means on an auxiliary arm 23 of the right hand bell crank lever. The valve 11 is therefore closed and at the same time, by means of the pin 20, the detent 21 is withdrawn so as to allow the spindle 7 to take up its normal position. The operation of lever 22 also opens an auxiliary valve 24 which admits air to a chamber 25, which is also connected to the train pipe by way of the port 26. The valve 24 is provided to ensure that the lever 22 must be at once restored to normal after operation if the brake application is to be released. Chamber 25 is bounded by the two flexible diaphragms 27 and 28 which are attached to the shoe 1 so that chamber 25 is effectively sealed in spite of the movement of the shoe. Connection is made from the hollow interior of the shoe to the chamber 25 by means of the ports 29. Consequently, it will be appreciated that if the shoe should become broken by contact with some obstruction, the brakes would at once be applied owing to the ingress of air by way of the fractured portion of the shoe. The operation of the valve 10 is substantially similar to that of the valve 11 except that in this case when the valve is opened, chamber 18 is connected directly to the atmosphere by way of the ports 30, so that a full emergency application of the brakes takes place. The means for reclosing valve 10 are also similar to those described in connection with valve 11, except that in this case, the operation of the Bowden cable is arranged to be effected slowly, and for this purpose a bolt 31 engaging in a threaded hole in a fixed housing 62 is provided, so that in order to operate the auxiliary arm 32 a considerable number of turns must be given to the handle 33. It then becomes necessary to make an equal number of turns in the opposite direction in order to reclose the auxiliary valve 34 connected with chamber 25. Thus a full emergency application of the brakes cannot be released until an interval has elapsed which can be arranged to be sufficiently long to ensure that whatever the speed of the train it will have been brought to rest before the vacuum is restored.

Referring now to Fig. 2 the track apparatus will be briefly described. Associated with each signal is a ramp such as 36 or 53, of the shape shown in Fig. 3. It will be noted that the size, shape and location of the ramp with respect to the rails is identical both for "caution" and for "stop" signals, and that the different effects are brought about solely by the use of currents of different characteristics. Associated with each signal also is a vibrator as at 40 or 51, which consists essentially of an electromagnet provided with an interrupter contact for interrupting its own circuit, and also adapted to close another circuit intermittently. In the preferred form, the vibrator comprises a double limbed electromagnet with a centrally pivoted polarized armature spring controlled so as normally to rest in a central position, this construction being found to give the greatest reliability in working.

To consider now the complete operation of the system, suppose that a train is approaching in the direction right to left. When the train reaches the short insulated section 35, which may conveniently be of two rail lengths and is located just in advance of the ramp 36 associated with the distant signal 37, a circuit will be completed from positive pole of battery 38, interrupter contact 39, windings of vibrator 40 to the insulated rail 35 and through the wheels of the train to the negative pole of the battery. The vibrator is therefore set in operation, and will continue to operate until the train passes clear of the insulated rail. Suppose in the first instance that the distant signal is at "danger". In this case the arm contact 41 will be in the position shown and by the operation of the vibrator a negative pulsating current from battery 46 will be connected to the ramp 36. It should be mentioned that the shoe and associated mechanism is insulated from the frame of the engine in any suitable manner. The current picked up will, therefore, pass through one winding of the transformer 42 and thence through the exciting coils 16 on the pole pieces of the permanent magnet. With current in this direction, however, the flux generated by the winding 16 is opposed to that of the permanent magnet and consequently the armature 57 is released, thereby permitting the opening of valve 11. The chamber 18 is, therefore, connected to atmosphere through the restricted orifice formed by the reed 17, a service application of the brakes takes place and an audible warning is given to the driver. The pulsating current passing through the primary of the transformer 42 will induce in the secondary an alternating current which will energize the alternating current electromagnet 12. This current also flows through the magneto bell 47 which is of well known type; in this case, however, the current flowing is not sufficient to operate the bell. As electromagnet 12 is energized, however, it will hold its armature 59 attracted so that the valve 10 is not opened at this time. The driver may now operate and release the lever 22, thereby restoring the valve 11 to normal and, subsequently allowing the brakes to be taken off.

Suppose now that the distant signal is at "clear" when the train passes it; in this case the circuit for the ramp 36 will be by way of vibrating contacts of vibrator 40, arm contact 41 in its right hand position, arm contact 43 of the home signal in its right hand position (since the home signal will have been lowered) contact 44 on the distant signal lever 54 in its right hand position corresponding to the reversed position of the lever and thence to the positive pole of battery 45. Battery 45 it should be noted, is of approximately double the voltage of battery 46 from which the pulsating current was sent in the previous case. The effect of the positive pulsating current picked up in this case is that the polarized electromagnet is energized as well as the alternating current electromagnet so that they both maintain their armatures attracted and neither of the valves 10 or 11 is opened. In addition the current through the secondary of the transformer is now sufficiently strong to operate the bell 47 so that a distinctive audible signal is given to the engine driver to indicate to him that the distant signal has been passed at "clear".

Assume now that the train is approaching a "stop" signal such as the home signal 48 which is at "clear". In this case the circuit for the associated ramp 53 will be by way of the arm contact 49 of the home signal in its right hand position, signal lever contact 50 in its right hand position corresponding to the reversed position of the signal lever 55, vibrating contacts of vibrator 51 to an intermediate point of battery 45. The vibrator it should be noted, was set in operation by the closure of the signal lever contact 52 when the home signal was lowered. The positive pulsating current thereby transmitted to the ramp produces the same effect on the apparatus carried by the locomotive as in the case just described, except that the alternating current from the secondary of the transformer is not in this case sufficiently strong to operate the bell 47. Thus when the train passes a "stop" signal at "clear" the driver does not receive any indication whatever.

Finally let the case be considered when the train passes a "stop" signal at "danger". In this case it is clear from Fig. 2 that the associated ramp is connected to earth by way of contact 49 in the position shown and hence no current at all flows to the electromagnets on the locomotive. In consequence both the armatures 57 and 59 fall away, both the valves 10 and 11 are opened and a full emergency application of the brakes takes place. As already pointed out, in order to effect the release of the brakes the driver must operate the handle 33 first in one direction and then in the other, and the time necessary to do this will be arranged to be amply sufficient for the train to be brought to rest whatever its speed. It will also, of course, be necessary to operate the handle 22 in order to close valve 11. In some cases, for instance, where sufficient braking distance cannot be obtained beyond the home signal, it may be desirable to arrange for a full emergency application of the brakes at the distant signal, and obviously very slight modifications are needed to bring this about.

It will be noted, that if by any chance the ramp should be connected either to a direct current supply or to an alternating current supply, the brakes would be applied in either case; in the first case with direct current the alternating current magnet would release its armature as it could not be energized through the transformer and the emergency brake application would occur, while in the other case the alternating current would not maintain the armature of the polarized magnet attracted as the effect of the permanent magnet would be neutralized at each alternation of the current and therefore the service application would be given with an audible warning.

It will thus be appreciated that the apparatus on the train is of a substantial character requiring for its successful operation neither contacts nor a source of electrical energy on the locomotive; and at the same time it will be appreciated that it is designed to fulfil all the important conditions which are requisite in systems of this character, while the provision of a distinctive current ensures that there is no faulty operation of the apparatus due to the presence of stray currents connected to the ramp.

What I claim and desire to protect by Letters Patent is:—

1. A train control system comprising a track, a ramp located alongside said track, means for connecting a periodic current to said ramp, a train, a shoe on said train adapted to engage conductively with said ramp, a brake applying device on said train, a means normally acting on said brake applying device tending to effect the application of the brakes, a second means more powerful than said first means and acting counter thereto on said brake applying device for normally preventing the application of the brakes and operable by said shoe into an ineffective position, and a device on said train electrically connected to said shoe and responsive to said periodic current to act counter to said first means when said second means is in its ineffective position inoperative to prevent the application of the brakes.

2. A train control system comprising a track, a ramp located alongside said track, means for connecting a periodic current to said ramp, a shoe on said train adapted to engage conductively with said ramp, a brake controlling member on said train, means for operating said brake controlling member, a device on said train electrically connected to said shoe and responsive to said periodic current to prevent said means from becoming effective, manually operated means for removing the application of the brakes after said brake controlling member has been operated and means also operated by the manually operated means to prevent the removal of the brake application occurring until the manually operated means has been restored.

3. A train control system comprising a track, two devices located alongside said track at different positions, means for connecting to the first of said devices one kind of non-continuous electrical current which is distinctive of the position of said first device, means for connecting to the second device another kind of non-continuous electrical current which is distinctive of the position of said second device, a train, apparatus on said train adapted to engage electrically with said devices, a device on said train electrically connected to said apparatus and responsive to one kind of electrical current, a brake controlling member controlled by said device and adapted to effect a partial application of the brakes, a second device on said train electrically connected to said apparatus and responsive to the other kind of electrical current and a brake controlling device controlled by said second device and adapted to effect a full application of the brakes.

4. In combination for use in a train control system, a track, a device located alongside said track and adapted to electrically engage with complementary apparatus on a passing train, a source of direct-current energy and means controlled by said train for controlling the intermittent application of said source to said track apparatus for controlling the application of the brakes of said train.

5. In combination for use in a train control system, a track, a ramp located alongside said track, a source of direct current electrical energy having one pole connected to said track, and an electromagnetic vibrator controlled by a passing train adapted to connect the other pole of said source intermittently to said ramp for the purpose of controlling the application of the brakes on said train.

6. In combination for use in a train control system, a track, a device located alongside said track and adapted to engage electrically with complementary apparatus on a passing train, a source of direct current electrical energy, signal controlling means and means controlled by said signal controlling means for effecting the intermittent application of said source to said track apparatus for controlling the application of the brakes of a passing train.

7. In combination for use in a train control system, a track, a ramp located alongside said track, a source of direct current electrical energy having one pole connected to said track, an electromagnetic vibrator adapted to connect the other pole of said source intermittently to said ramp, signal controlling means and means controlled by said signal controlling means for setting said vibrator in operation.

8. In combination for use in a train control system, a track, a ramp centrally located between the rails of said track, means for generating different kinds of non-continuous current, means adapted to be engaged by passing trains to cause said generating means to operate, and means for connecting said current to said ramp for the purpose of exerting different controls on the application of the brakes of said train.

9. In combination for use in a train control system, a track, a ramp located alongside said track, a source of strong pulsating current of one polarity, a source of weak pulsating current of opposite polarity and means for connecting either of said sources to said ramp.

10. In combination for use in a train control system, a track, a distant signal, a ramp located alongside said track adjacent to said distant signal, a source of direct current electrical energy having one pole connected to said track, a second source of direct current electrical energy having its opposite pole connected to said track and having a higher voltage than said first source of electrical energy, a vibrator and switching means controlled by said distant signal according to its position for connecting up either the other pole of said first source of electrical energy or the other pole of said second source of electrical energy through the vibrator so as to connect pulsating currents of varying strength and polarities to said ramp.

11. In combination for use in a train control system, a track, a home signal and a distant signal, both located alongside said track at a predetermined distance apart, a ramp centrally disposed with regard to said track and located alongside said home signal, a second ramp centrally disposed with regard to said track and located alongside said distant signal, two batteries having opposite poles connected to said track, a vibrator associated with said first ramp, a vibrator associated with said second ramp, switching means controlled by said home signal, switching means controlled by said distant signal and interconnecting means between the other poles of said batteries, said vibrators, said ramps and said switching means whereby pulsating currents of opposite polarities may be connected to said ramps either separately or together in accordance with the positions of the signals.

12. In combination for use in a train control system, a track, a ramp located alongside said track, a source of electrical current means for closing one point in a circuit for connecting said source of electrical energy to said ramp and automatic means controlled by the passage of a train for completing said circuit intermittently to cause a pulsating current to be connected to said ramp.

13. In combination for use in a train control system, a track, a ramp located alongside said track, a battery, an electromagnetic vibrator, a circuit completed by the passage of the train for energizing said electromagnetic vibrator and a second circuit separate from said first circuit and extending between said battery and said ramp over contacts of said vibrator whereby pulsating current is connected to said ramp.

14. In combination for use in a train control system, a track, a ramp located alongside said track, a short insulated rail provided in one of the rails of said track, an electromagnetic vibrator and a source of electrical energy connected in series between said insulated rail and the main rail of said track, a second source of electrical energy having one pole connected to said track and the other pole connected to contacts controlled by said vibrator and interconnecting means between the said contacts and said ramp so that the other pole of said second source of electrical energy is intermittently connected to said ramp.

15. A train control system, comprising a track, a distant signal and a home signal located alongside said track in predetermined positions and separated from each other by a predetermined distance, a ramp located alongside said distant signal, a ramp located alongside said home signal, sources of pulsating current of opposite polarity, switching means controlled by said distant signal for connecting either one source of pulsating current or the other to the ramp located adjacent to the distant signal according to the position of said distant signal, and switching means controlled by said home signal for connecting one source of pulsating current to the ramp located adjacent to the home signal only if said home signal is in the clear position.

16. In combination for use in a train control system, a track, a distant signal and a home signal located alongside said track in predetermined positions and separated from each other by a predetermined distance, a ramp located alongside said distant signal, a ramp located alongside said home signal, a source of direct current electrical energy, an electromagnetic vibrator located alongside said distant ramp, automatic means controlled by the passage of a train for energizing said electromagnetic vibrator to cause pulsating current to be connected to said distant ramp when said distant signal is in the clear position, a second source of direct current electrical energy, an electromagnetic vibrator located alongside said home ramp and means controlled by said home signal for energizing said second electromagnetic vibrator to cause pulsating current to be connected to said home ramp when the home signal is in the clear position.

17. For use on a train or locomotive in a train control system, a shoe, a circuit extending from said shoe, a brake controlling device comprising two electromagnetic devices of different kinds responsive to different kinds of current transmitted over said circuit which must be energized together if the application of the brakes is to be prevented when the application is placed under their control.

18. For use on a train or locomotive in a train control system, a brake controlling device comprising an electromagnet adapted to respond to alternating current only, and a polarized electromagnet adapted to respond to one polarity only of current, the simultaneous energization of both electromagnets being necessary to prevent the application of the brakes when the application is placed under their sole control.

19. For use on a train or locomotive in a train control system, a shoe, a circuit extending from said shoe, a brake controlling device comprising two electromagnetic devices of different kinds responsive to different kinds of current transmitted over said circuit, and means adapted to be actuated by apparatus located alongside said track for placing the application of the brakes under the control of said electromagnetic devices, both of which must be energized simultaneously if the application of the brakes is to be prevented.

20. For use on a train or locomotive in a train control system, a brake controlling device comprising two electromagnetic devices of different kinds responsive to different kinds of current and collecting means adapted to electrically engage with apparatus located alongside said track to collect current for said electromagnetic devices, the simultaneous energization of which is necessary to prevent the application of the brakes.

21. For use on a train or locomotive in a train control system, a brake controlling device comprising two electromagnetic devices of different kinds adapted to respond to different kinds of current, means controlled by apparatus located alongside the track adapted to place the brakes under the control of said electromagnetic devices and collecting means adapted to collect current from said track apparatus to energize said electromagnetic devices when the application of the brakes is under their control, the simultaneous energization of both devices being necessary to prevent the application of the brakes.

22. For use on a train or locomotive in a train control system, a brake controlling device comprising a valve for admitting braking fluid and arranged so that the pressure of braking fluid tends to open said valve, spring means for normally maintaining said valve on its seat, an electromagnet having an armature controlled by said spring means so as to normally rest against the pole pieces of said electromagnet, a shoe adapted to be displaced by a ramp located alongside said track to render said spring means inoperative and to electrically connect said ramp with said electromagnet, locking means controlled by said valve when opened due to the failure of current to traverse said electromagnet to maintain said spring means inoperative to restore said valve when the shoe takes up a normal position after passing said ramp, and means controlled by the engine driver for restoring said valve to its seat and releasing said locking means to permit said spring means to become again operative to maintain said valve on its seat.

23. For use on a train or locomotive in a train control system, a brake controlling device comprising a valve for freely admitting braking fluid to the brakes, a second valve for admitting braking fluid to said brakes at a restricted rate, an electromagnet responsive to one kind of current for controlling the operation of said first valve, a second electromagnet responsive to a different kind of current to said first electromagnet for controlling the operation of said second valve and collecting means for collecting from devices located alongside said track current for the operation of said electromagnets, so as to permit either, neither or both of said valves to be opened in accordance with the electrical condition of the track devices.

24. For use on a train or locomotive in a train control system, a brake controlling device comprising a valve for freely admitting braking fluid to the brakes, a second valve for admitting braking fluid to the brakes at a restricted rate, an electromagnet responsive to one kind of electrical current adapted when energized to prevent said first valve from opening, a second electromagnet responsive to another kind of electrical current adapted when energized to prevent said second valve from opening, a shoe for collecting current from a ramp located alongside said track and a connecting lead whereby current is adapted to be fed from the ramp to both of said electromagnets.

25. For use on a train or locomotive in a train control system, a brake controlling device comprising a valve for freely admitting braking fluid to the brakes, a second valve for admitting braking fluid to the brakes at a restricted rate, an alternating current electromagnet adapted when energized to prevent said first valve from opening, a polarized electromagnet adapted when energized to prevent said second valve from opening, and a shoe adapted to collect current from the track and connect it to a circuit including both said electromagnets.

26. For use on a train or locomotive in a train control system, a brake controlling device comprising a valve for freely admitting braking fluid to the brakes when opened, a second valve for admitting braking fluid at a restricted rate to the brakes when opened, a shoe for collecting current from apparatus located alongside the track, a transformer, and alternating current electromagnet connected to one winding of said transformer and adapted when energized to prevent the opening of said first valve, a polarized electromagnet adapted when energized to prevent the opening of said second valve and a circuit including the other winding of said transformer, said polarized electromagnet and said ramp.

27. For use on a train or locomotive in a train control system, a brake controlling device comprising a valve for freely admitting braking fluid to the brakes when opened, a second valve for admitting braking fluid at a restricted rate to the brakes when opened, a shoe for collecting current from apparatus located alongside the track, a transformer, an alternating current electromagnet connected to one winding of said transformer and adapted when energized to prevent the opening of said first valve, a polarized electromagnet adapted when energized to prevent the opening of said second valve, a circuit including the other winding of said transformer, said polarized electromagnet and said apparatus, and signalling means included in the circuit of said electromagnet and said first transformer winding and adapted to respond only to a current of greater magnitude than is necessary to maintain said electromagnet energized.

28. For use on a train or locomotive in a train control system, a brake controlling device comprising a shoe adapted to be moved in a vertical direction when passing over a ramp located alongside the track, said shoe having a hollow interior extending into that part of the shoe which projects beyond the frame of the train and perforated sides at one portion thereof, diaphragms secured to said shoe above and below said perforations and a chamber to the walls of which the outer edges of said diaphragms are secured, and means for connecting said chamber to the train pipe through which fluid for maintaining the brakes in an off position is supplied.

29. For use on a train or locomotive in a train control system, a brake controlling device comprising a valve for freely admitting air to the brakes, a second valve for admitting air to the brakes at a restricted rate, a reed located in the passage by which air is connected to said second valve to give an audible warning on the passage of air therethrough, a bell crank lever connected to the stem of said first valve, a second bell crank lever connected to the stem of said second valve, an alternating current electromagnet having its armature secured to one limb of said first bell crank lever, a polarized electromagnet having its armature connected to one limb of said second bell crank lever, a spring, a rod having a collar engaged by said spring and adapted to normally press against one limb of said first bell crank lever to hold said first valve against its seat and the armature of said alternating current electromagnet against the pole pieces of said electromagnet, a second spring, a second rod adapted to normally press against one limb of said second bell crank lever to hold said second valve against its seat and the armature of said polarized electromagnet against the pole pieces of said electromagnet, a shoe centrally located with respect to said rods and adapted to move in a vertical direction when engaging a ramp alongside the track, a collar on said shoe adapted to raise said rods when said shoe is raised, a circuit extending from said shoe and including said polarized electromagnet and said alternating current electromagnet, means for opening either, neither or both of said valves depending on the nature of current received by said shoe from said ramp, holding means controlled by each of said valves for maintaining said rods in the position to which they have been raised by said shoe, a manually controlled quick operating device for effecting the restoration of said second valve and removing said associated holding means, and a manually controlled slow acting device for effecting the restoration of said first valve and removing said associated holding means and valves controlled by said manually operated devices for admitting air to the brakes until said manually operated devices are restored to normal position.

30. A train control system comprising a track, two ramps located in the centre of said track at predetermined positions, means for connecting a pulsating current of one polarity to said ramps if the track is clear and of a different polarity to the first of said ramps and disconnecting the other ramp if the track is not clear, a train, a shoe carried by said train and adapted to be raised by engagement with either of said ramps, a valve for controlling an emergency application of the brakes, a spring, a rod acted upon by said spring normally holding said valve closed and adapted to be raised when said shoe is raised by contact with either of said ramps, a detent operated when said valve is opened to retain said rod in its operated position against the action of said spring, a valve for controlling a partial application of the brakes, a second spring, a second rod acted upon by said second spring normally holding said second valve closed and adapted to be raised when said shoe is raised by contact with either of said ramps, a second detent operated when said second valve is opened to retain said second rod in its operated position against the action of said second spring, a three-armed bell-crank-lever to one arm of which said first valve is connected, an alternating current electromagnet, an armature for said electromagnet located on the second arm of said bell-crank-lever, slow-acting restoring means acting on the third arm of said bell-crank-lever, an auxiliary valve for controlling the admission of braking fluid adapted to be opened when said restoring means are operated, a second three-armed bell-crank-lever to one arm of which said second valve is connected, a polarized electromagnet, an armature for said electromagnet located on the second arm of said second bell-crank-lever, quick acting restoring means acting on the third arm of said second bell-crank-lever, and a second auxiliary valve for controlling the admission of braking fluid and adapted to be opened when said quick-acting restoring means are operated, so that if both of said main valves are opened owing to the non-energization of said electromagnets when said shoe is raised by contact with said ramp both of said restoring means must be operated and released before the brakes can be taken off.

31. A train control system comprising a track, a ramp located alongside said track, means for connecting current to said ramp, a shoe on a train adapted to engage said ramp, a brake controlling member on the train, means for operating said brake controlling member to cause an emergency application or to effect a service application of the brakes, a device on the train connected to said shoe and responsive to said current to prevent said means from becoming effective and manually operated means for removing the application of the brakes within a minimum period after said brake controlling member has been operated depending on the character of the brake application.

32. For use on a train or locomotive in a train control system, a brake controlling device comprising valves for admitting braking fluid to the brakes, an electro-magnetic device comprising two-electro-magnets one responsive to pulsating and the other to alternating current for maintaining said valves closed and means mechanically operated by apparatus located alongside the track to cause one of said valves to open if either alternating or pulsating current is not flowing through said device at that instant.

33. For use on a train or a locomotive in a train control system, a brake controlling device comprising two electromagnetic devices of different kinds responsive to different kinds of current, collecting means adapted to electrically engage with apparatus located alongside said track to collect current for said electromagnetic devices, and means for supplying a single kind of current to said collecting means to bring about the simultaneous energization of said devices to prevent the application of the brakes.

34. For use on a train or locomotive in a train control system, a brake controlling device comprising two electromagnetic devices of different kinds adapted to respond to different kinds of current, means controlled by apparatus located alongside the track adapted to place the brakes under the control of said electromagnetic devices and means collecting one kind of current at a time from said track apparatus to energize said electromagnetic devices when the application of the brakes is under their control, the simultaneous energization of both devices being necessary to prevent the application of the brakes.

In testimony whereof I affix my signature.

ALFRED ERNEST HUDD.